US007742688B2

(12) United States Patent
Zou et al.

(10) Patent No.: US 7,742,688 B2
(45) Date of Patent: Jun. 22, 2010

(54) CIRCUIT FOR CONTROLLING ROTATION SPEED OF COMPUTER FAN

(75) Inventors: Hua Zou, Shenzhen (CN); Feng-Long He, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 319 days.

(21) Appl. No.: 12/023,012

(22) Filed: Jan. 30, 2008

(65) Prior Publication Data

US 2009/0162039 A1 Jun. 25, 2009

(30) Foreign Application Priority Data

Dec. 21, 2007 (CN) ........................ 2007 1 0203316

(51) Int. Cl.
*H02P 7/29* (2006.01)

(52) U.S. Cl. ........................ 388/811; 388/825; 318/268; 318/434; 361/395; 62/126; 62/181

(58) Field of Classification Search ................. 388/811, 388/819, 825, 829; 318/434, 268; 361/395; 62/126, 181
See application file for complete search history.

(56) References Cited

U.S. PATENT DOCUMENTS 7,100,382 B2 * 9/2006 Butler et al. .................. 62/126
7,355,359 B2 * 4/2008 Kuo ........................... 318/268
7,444,824 B1 * 11/2008 Butler et al. .................. 62/230
7,464,561 B1 * 12/2008 Butler et al. .................. 62/181
7,495,407 B2 * 2/2009 Huang et al. ................ 318/599
7,501,717 B2 * 3/2009 Chen ........................... 307/38
7,541,762 B2 * 6/2009 Chen et al. .................. 318/434
2005/0016191 A1 * 1/2005 Butler et al. .................. 62/158
2007/0019383 A1 * 1/2007 Chang ........................ 361/695
2007/0081800 A1 * 4/2007 Hsiang et al. ............... 388/811
2007/0108923 A1 * 5/2007 Chen ........................... 318/66
2007/0148019 A1 * 6/2007 Chen ....................... 417/423.1
2007/0201986 A1 * 8/2007 Huang et al. ............... 417/44.1
2007/0229291 A1 * 10/2007 Kuo ........................... 340/584
2007/0292257 A1 * 12/2007 Ooi et al. ....................... 415/1
2008/0004755 A1 * 1/2008 Dunstan et al. ............. 700/299
2008/0095521 A1 * 4/2008 Chen et al. .................. 388/829
2009/0003806 A1 * 1/2009 Zou et al. ................... 388/811
2009/0169188 A1 * 7/2009 Huang et al. ................ 388/811
2009/0175602 A1 * 7/2009 Qian et al. .................. 388/825
2009/0208192 A1 * 8/2009 Xi et al. ...................... 388/819

* cited by examiner

*Primary Examiner*—Paul Ip
(74) *Attorney, Agent, or Firm*—Frank R. Niranjan

(57) ABSTRACT

A circuit for controlling rotation speed of a computer fan includes a fan connector providing for controlling the rotation speed of the computer fan, a rotation speed detector providing for detecting the rotation speed of the computer fan, a BIOS chip connected to the fan connector via the rotation speed detector and provided for receiving, and comparing rotation speed signals from the rotation speed detector, a super I/O chip connected to the BIOS chip and provided for outputting either a PWM signal or another PWM signal to be converted to a voltage signal to control rotation speed of the computer fan according to the result of the comparison, a integrated circuit connected to the super I/O chip and the fan connector and configured for converting the another PWM signal to an analog voltage signal.

13 Claims, 2 Drawing Sheets

CIRCUIT FOR CONTROLLING ROTATION SPEED OF COMPUTER FAN

CROSS-REFERENCE TO RELATED APPLICATION

Relevant subject matter is disclosed in co-pending U.S. patent application entitled "METHOD AND CIRCUIT FOR CONTROLLING ROTATION SPEED OF COMPUTER FAN", filed on Dec. 11, 2007 with application Ser. No. 11/953,866, and assigned to the same assignee as this application.

BACKGROUND

1. Field of the Invention

The present invention relates to computer fans, and particularly to a circuit for controlling rotation speed of a computer fan.

2. Description of Related Art

Generally, a computer system includes a motherboard with various chips such as a central processing unit (CPU) mounted thereon, a storage device such as a hard disc, and input/output devices. Many of these devices generate heat when the computer system is operating, particularly the CPU. If the heat generated from the CPU is not dissipated in a timely fashion, it may damage the CPU or even other parts of the computer system.

Typically, a sensor is programmed to be used as a temperature detector for detecting the temperature of the CPU. A computer fan is used to facilitate removal of heat to keep the temperature of the CPU within a safe range. A fan controller is provided to adjust the fan speed to be more energy efficient while still providing enough heat dissipation. Two common kinds of computer fans are 3-pin fans and 4-pin fans. The fan speed of a 3-pin fan can be adjusted by changing a voltage signal (power signal) input to the 3-pin fan. The changed voltage signal corresponds to a change in a first pulse-width modulation (PWM1) signal output by a basic input/output system (BIOS) of the motherboard. The fan speed of a 4-pin fan can be adjusted by a second pulse-width modulation (PWM2) signal output by the basic input/output system (BIOS) of the motherboard directly to the 4-pin fan.

In a 3-pin fan motherboard, a 3-pin fan is connected to the motherboard by a 3-pin header mounted on the motherboard, and a 3-pin fan controller is used to provide the voltage signal to the 3-pin fan for adjusting the rotation speed of the 3-pin fan. In a 4-pin fan motherboard, a 4-pin fan is connected to the motherboard by a 4-pin fan header mounted on the motherboard, and a 4-pin fan controller is used to provide the PWM signal to the fourth pin of the 4-pin fan for adjusting the rotation speed of the 4-pin fan. In theory, the 3-pin fan can be connected to the 4-pin fan motherboard by the 4-pin header. However, the 3-pin fan cannot be controlled by the 4-pin fan controller because the 3-pin fan does not have the fourth pin and cannot receive the PWM signal from the 4-pin fan controller. Therefore, the CPU of the 4-pin fan motherboard may be damaged because the heat may not be dissipated properly.

What is needed, therefore, is a means for adjusting the rotation speed of a computer fan, whether the computer fan be a 3-pin fan or a 4-pin fan.

SUMMARY

An exemplary circuit for controlling rotation speed of a computer fan, the control circuit comprises a fan connector comprising a power pin for receiving power and for controlling a rotation speed of the computer fan if the computer fan is a 3-pin fan, a pulse-width modulation (PWM) control pin for controlling the rotation speed of the computer fan if the computer fan is a 4-pin fan, and a detection pin; a rotation speed detector configured for detecting the rotation speed of the computer fan, an input of the rotation speed detector connected to the detection pin of the fan connector; a basic input/output system (BIOS) chip comprising an input terminal connected to an output of the rotation speed detector, and configured to receive and store rotation speed signals output from the rotation speed detector; a super input/output (I/O) chip comprising a first terminal connected to an output terminal of the BIOS chip, and second and third terminals respectively outputting first and second PWM signals, the PWM control pin of the fan connector connected to the third terminal of the super I/O chip to receive the second PWM signals; and an integrated circuit having an input terminal connected to the second terminal of the super I/O chip to receive the first PWM signal, and an output terminal configured to output a corresponding analog voltage signal for the power pin of the fan connector; wherein the BIOS chip is further configured to compare two rotation speed signals corresponding to two different second PWM signals output to the PWM control pin of the fan connector, and send a result of the comparison to the super I/O chip; and the super I/O chip is configured to output either first PWM signals or second PWM signals as rotation speed control signals according to the result of the comparison.

Other novel features and advantages will become more apparent from the following detailed description of preferred and exemplary embodiments when taken in conjunction with the accompanying drawings, in which:

DETAILED DESCRIPTION

Figure 1:
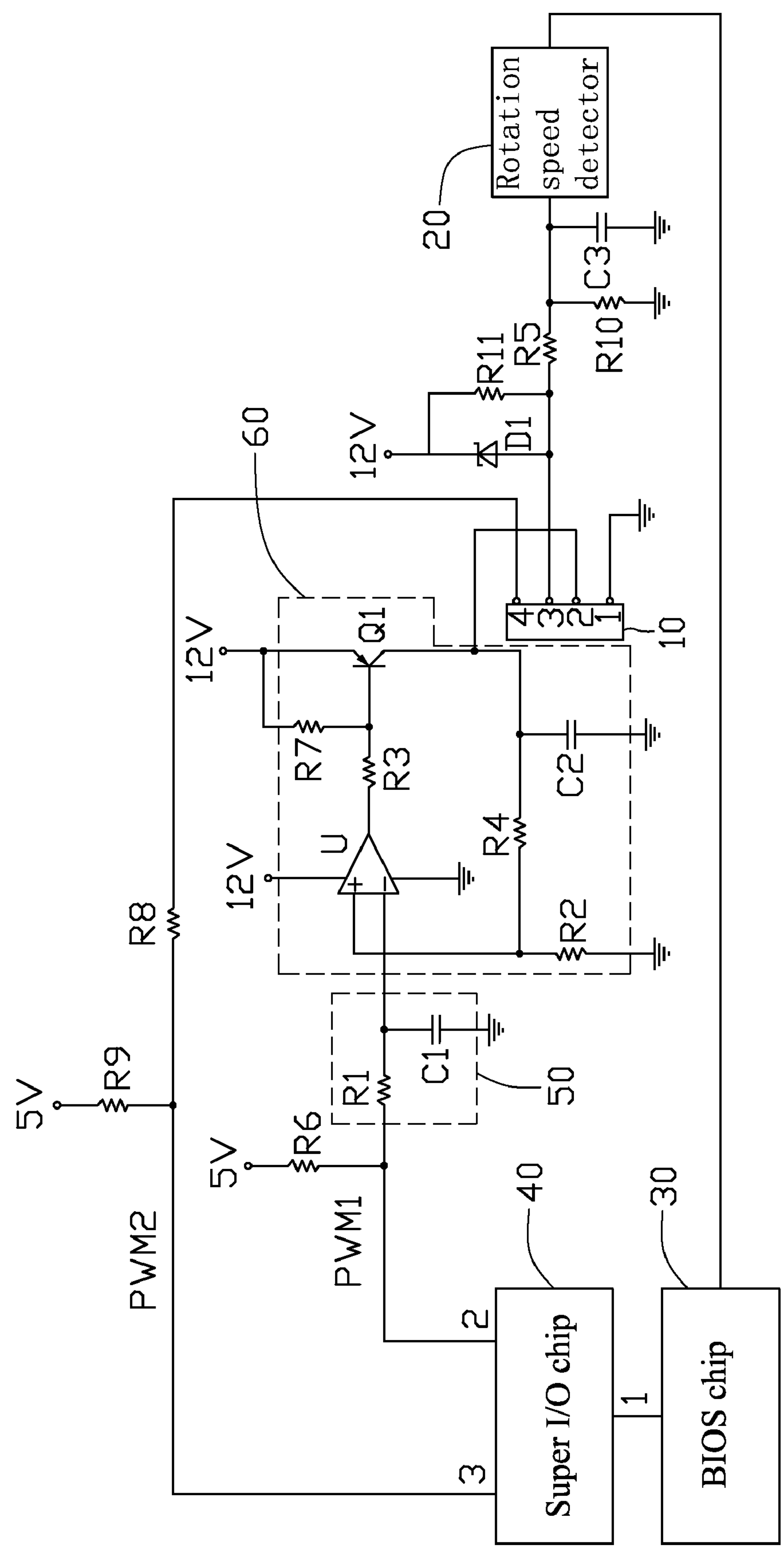
FIG. 1 is a diagram of a circuit for controlling rotation speed of a computer fan in accordance with an exemplary embodiment of the present invention.

Referring to FIG. 1, a circuit for controlling rotation speed of a computer fan in accordance with an exemplary embodiment of the present invention includes a BIOS chip 30, a super I/O chip 40, an integrated circuit (IC) 50 having a resistor R1 and a capacitor C1, a linear voltage regulating circuit 60 having an amplifier U and a transistor Q1 functioning as a current controller, a fan connector 10, and a rotation speed detector 20. In this embodiment, the transistor Q1 is a positive-negative-positive (PNP) transistor. Typically, the computer fan is connected to a motherboard of a computer.

The super I/O chip 40 includes a first terminal 1, a second terminal 2 connected to a 5V power source via a resistor R6, and a third terminal 3 connected to the 5V power source via a resistor R9. In other embodiments, the 5V power source, the resistor R6, and the resistor R9 can be omitted. The BIOS chip 30 includes an output terminal connected to the first terminal 1 of the super I/O chip 40, and an input terminal. The amplifier U includes a negative input terminal connected to a node between the resistor R1 and the capacitor C1 and connected to the second terminal 2 of the super I/O chip 40 via the resistor R1 to receive a PWM1 signal therefrom, a positive terminal grounded via a resistor R2, an output terminal, a power terminal connected to a 12V power source, and a ground terminal. The base of the transistor Q1 is connected to the output terminal of the amplifier U via a resistor R3. The emitter of the transistor Q1 is connected to the 12V power source, and is connected to the base of the transistor Q1 via a resistor R7. The collector of the transistor Q1 is connected to the positive terminal of the amplifier U via a resistor R4, and is grounded via a capacitor C2. The fan connector 10 includes a first pin 1 (ground pin) connected to ground, a second pin 2 (power pin) connected to the collector of the transistor Q1, a third pin 3 (detection pin) connected to an input of the rotation speed detector 20 via a resistor R5, and a fourth pin 4 (PWM control pin) connected to the third terminal 3 of the super I/O chip 40 via a resistor R8 to receive a PWM2 signal therefrom. A diode D1 and a resistor R11 are connected in parallel between the third pin 3 of the fan connector 10 and the 12V power source, with the anode of the diode D1 connected to the third pin 3 and the cathode of the diode D1 connected to the 12V power source. A resistor R10 and a capacitor C3 are connected in parallel between the input of the rotation speed detector 20 and ground. The rotation speed detector 20 includes an output connected to the input terminal of the BIOS chip 30. The connection between the positive input terminal of the amplifier U and the collector of the transistor Q1 forms a negative feedback loop for steadying the circuit.

Figure 2:
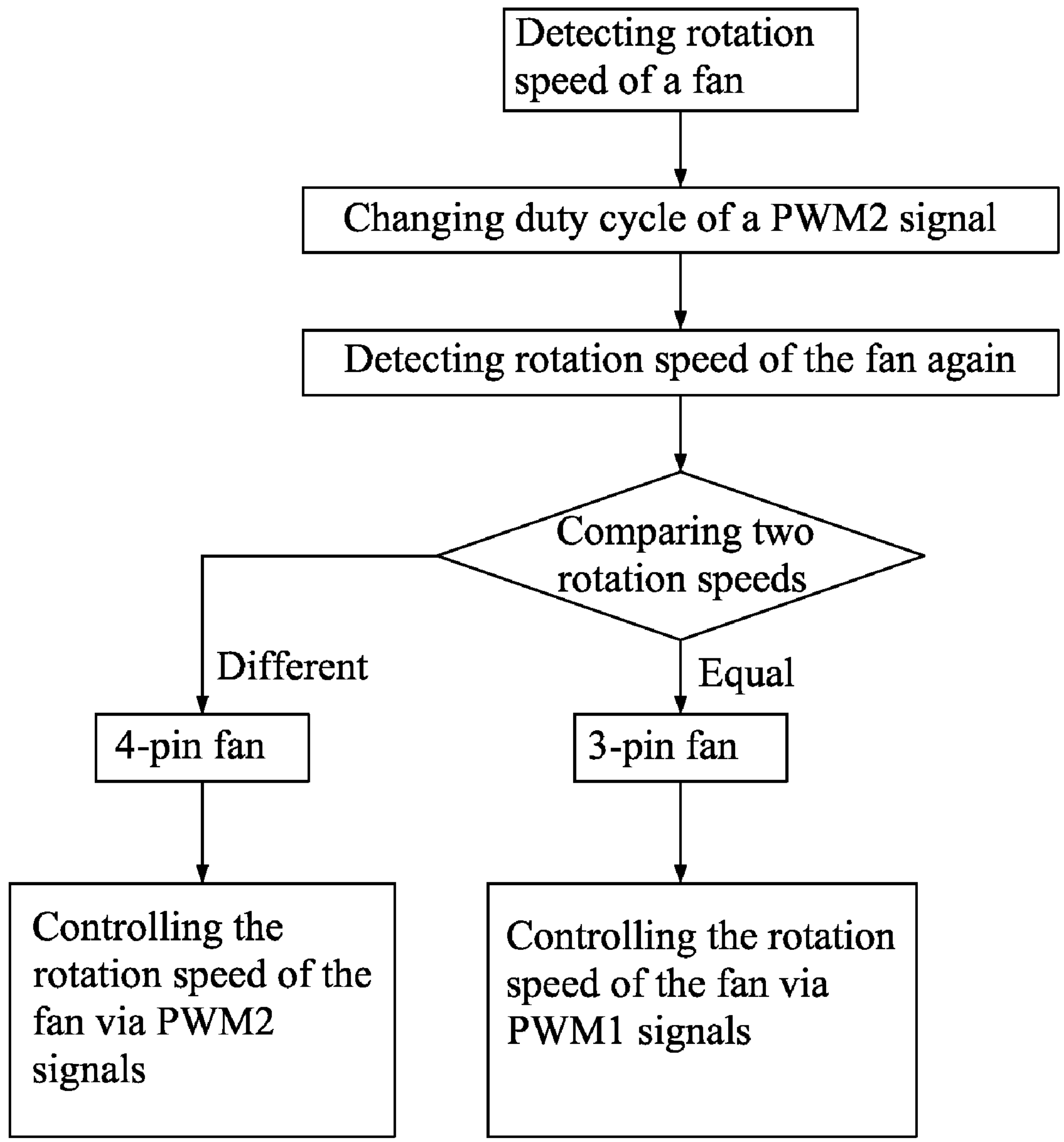
FIG. 2 is a flow diagram of an exemplary method for controlling rotation speed of a computer fan using the circuit of FIG. 1.

Referring to FIG. 2, an exemplary method of controlling rotation speed of the computer fan, utilizing the above-described circuit, includes the following steps:

Step 1: detecting a rotation speed of the computer fan by the rotation speed detector 20, and sending the rotation speed to the BIOS chip 30.

Step 2: changing a duty cycle of the PWM2 signal by the super I/O chip 40; in this embodiment, the duty cycle of the PWM2 signal is reduced to one half of a previous duty cycle.

Step 3: detecting the rotation speed of the computer fan by the rotation speed detector 20 after changing the duty cycle of the PWM2 signal, and sending the rotation speed to the BIOS chip 30.

Step 4: comparing the rotation speeds detected before and after changing the duty cycle of the PWM2 signal by the BIOS chip 30, and sending a result of the comparison to the super I/O chip 40.

Step 5: controlling the computer fan as a 4-pin fan by the PWM2 signals, when the rotation speed detected after changing the duty cycle of the PWM2 signal is half of the rotation speed detected before changing the duty cycle of the PWM2 signal; or controlling the computer fan as a 3-pin fan by voltage signals converted from the PWM1 signals, when the two above-mentioned rotation speeds are equal.

More specifically, when the computer is powered on, the BIOS chip 30 controls the super I/O chip 40 to transmit a PWM2 signal whose duty cycle is one hundred percent to the fan connector 10, and the BIOS chip 30 memorizes the data of the corresponding rotation speed of the computer fan in a register of the BIOS chip 30.

Then the BIOS chip 30 controls the super I/O chip 40 to transmit the PWM2 signal whose duty cycle is fifty percent to the fan connector 10, and the BIOS chip 30 memorizes the data of the corresponding rotation speed of the computer fan in another register of the BIOS chip 30. If the computer fan is a 4-pin fan, the 4-pin fan receives the PWM2 signal via the fourth pin 4 of the fan connector 10, and the rotation speed of the computer fan changes (is reduced by half) accordingly. If the computer fan is a 3-pin fan, the 3-pin fan cannot receive the PWM2 signal at the fourth pin 4 of the fan connector 10, and the rotation speed of the computer fan remains the same accordingly. In this manner, the type of the computer fan is identified.

If the computer fan is a 4-pin fan, PWM2 signals are transmitted to the fourth pin of the fan connector 10 to control the rotation speed of the computer fan thereafter.

If the computer fan is a 3-pin fan, the BIOS chip 30 controls the super I/O chip 40 to output PWM1 signals to the IC 50. Each PWM1 signal is converted to an analog voltage signal by the IC 50. The analog voltage signal can be an increased voltage signal or a decreased voltage signal, according to a corresponding change in the duty cycle of the PWM1 signal. The analog voltage signal is transmitted to the negative input terminal of the amplifier U, and then the amplifier U outputs an amplified voltage signal. The transistor Q1 works in an amplification region. Therefore if the current of the base of the transistor Q1 is changed, the current change at the collector of the transistor Q1 is in direct proportion to the current change of the base. Thus a corresponding change occurs to the voltage signal at the collector of the transistor Q1. Because the change of the rotation speed of the computer fan is in direct proportion to the change of the voltage signal of the collector of the transistor Q1, the rotation speed of the computer fan is thus controlled by the PWM1 signal.

It is to be understood, however, that even though numerous characteristics and advantages of the present embodiments have been set forth in the foregoing description, together with details of the structures and functions of the embodiments, the disclosure is illustrative only; and that changes may be made in detail, especially in matters of shape, size, and arrangement of parts within the principles of the invention to the full extent indicated by the broad general meaning of the terms in which the appended claims are expressed.

What is claimed is:

1. A circuit for controlling rotation speed of a computer fan, the control circuit comprising:

a fan connector comprising a power pin for receiving power and for controlling a rotation speed of the computer fan if the computer fan is a 3-pin fan, a pulse-width modulation (PWM) control pin for controlling the rotation speed of the computer fan if the computer fan is a 4-pin fan, and a detection pin;

a rotation speed detector configured for detecting the rotation speed of the computer fan, an input of the rotation speed detector connected to the detection pin of the fan connector;

a basic input/output system (BIOS) chip comprising an input terminal connected to an output of the rotation speed detector, and configured to receive and store rotation speed signals output from the rotation speed detector;

a super input/output (I/O) chip comprising a first terminal connected to an output terminal of the BIOS chip, and second and third terminals respectively outputting first and second PWM signals, the PWM control pin of the fan connector connected to the third terminal of the super I/O chip to receive the second PWM signals; and an integrated circuit having an input terminal connected to the second terminal of the super I/O chip to receive the first PWM signal, and an output terminal configured to output a corresponding analog voltage signal for the power pin of the fan connector;

wherein the BIOS chip is further configured to compare two rotation speed signals corresponding to two different second PWM signals output to the PWM control pin of the fan connector, and send a result of the comparison to the super I/O chip; and the super I/O chip is configured to output either first PWM signals or second PWM signals as rotation speed control signals according to the result of the comparison.

2. The control circuit as claimed in claim 1, wherein the integrated circuit comprises a resistor and a capacitor connected in series between the input terminal of the integrated circuit and ground, and a node between the resistor and the capacitor acts as the output terminal of the integrated circuit.

3. The control circuit as claimed in claim 2, further comprising a linear voltage regulating circuit, wherein the linear voltage regulating circuit comprises an input terminal connected to the output terminal of the integrated circuit to receive the analog voltage signal, and an output terminal connected to the power pin of the fan connector to output a corresponding voltage signal to the power pin.

4. The control circuit as claimed in claim 3, wherein the linear voltage regulating circuit further comprises an amplifier and a transistor, a negative terminal of the amplifier acts as the input terminal of the linear voltage regulating circuit, a positive terminal of the amplifier is connected to the collector of the transistor via a resistor, an output of the amplifier is connected to the base of the transistor via a resistor, and the collector of the transistor acts as the output terminal of the linear voltage regulating circuit.

5. The control circuit as claimed in claim 4, wherein the base of the transistor is connected to the emitter of the transistor via a resistor.

6. The control circuit as claimed in claim 1, wherein a power source is connected to the second and third terminals of the super I/O chip.

7. The control circuit as claimed in claim 1, wherein a resistor is connected between the detection pin of the fan connector and the rotation speed detector, a resistor and a diode are connected in parallel between the detection pin of the fan connector and a power source, with the anode of the diode connected to the detection pin and the cathode of the diode connected to the power source.

8. A method for controlling rotation speed of a computer fan, the method comprising:

detecting a rotation speed of the computer fan;

changing a duty cycle of a second pulse-width modulation (PWM) signal output to the computer fan;

detecting a rotation speed of the computer fan after the duty cycle of the second PWM signal is changed;

providing a basic input/output system (BIOS) chip to compare the two rotation speeds, and sending a result of the comparison to a super input/output (I/O) chip; and the super I/O chip outputting the second PWM signal to the computer fan to control the rotation speed of the computer fan, or outputting a first PWM signal to be converted to a voltage signal to control the rotation speed of the computer fan, according to the result of the comparison.

9. The method as claimed in claim 8, wherein when the duty cycle of the second PWM signal is changed, the duty cycle of the second PWM signal is reduced to one half of a previous duty cycle.

10. The method as claimed in claim 9, wherein when the duty cycle of the second PWM signal is reduced to one half of the previous duty cycle, the rotation speed of the computer fan detected after changing the duty cycle is approximately half of the rotation speed of the fan detected before changing the duty cycle.

11. The method as claimed in claim 8, wherein if the two rotation speeds are equal, the computer fan is a 3-pin fan; and if the two rotation speeds are not equal, the computer fan is a 4-pin fan.

12. The method as claimed in claim 11, further comprising:

providing a fan connector comprising a power pin to receive the voltage signal for controlling the rotation speed of the computer fan if the computer fan is a 3-pin fan, a PWM control pin to receive the second PWM signal for controlling the rotation speed of the computer fan if the computer fan is a 4-pin fan, and a detection pin.

13. The method as claimed in claim 12, further comprising:

providing an integral circuit (IC) to convert the first PWM signal to an analog voltage signal;

providing an amplifier to amplify the analog voltage signal; and providing a transistor to regulate the amplified analog voltage signal to the voltage signal for controlling the rotation speed of the computer fan.

* * * * *